United States Patent
Zheng et al.

(10) Patent No.: US 9,933,897 B2
(45) Date of Patent: Apr. 3, 2018

(54) ARRAY SUBSTRATE AND TOUCH CONTROL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Dan Zheng, Beijing (CN); Jianmin Duan, Beijing (CN); Linlin Lu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 241 days.

(21) Appl. No.: 14/385,063

(22) PCT Filed: Dec. 12, 2013

(86) PCT No.: PCT/CN2013/089279
§ 371 (c)(1),
(2) Date: Sep. 12, 2014

(87) PCT Pub. No.: WO2015/035723
PCT Pub. Date: Mar. 19, 2015

(65) Prior Publication Data
US 2016/0239119 A1    Aug. 18, 2016

(30) Foreign Application Priority Data
Sep. 13, 2013   (CN) .......................... 2013 1 0419173

(51) Int. Cl.
G06F 3/045   (2006.01)
G06F 3/044   (2006.01)
G06F 3/041   (2006.01)

(52) U.S. Cl.
CPC ............ *G06F 3/044* (2013.01); *G06F 3/0412* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

2011/0074729 A1* 3/2011 Im .......................... G06F 3/0412
                                                       345/174
2012/0249436 A1* 10/2012 Choi .................... G02F 1/13338
                                                       345/173
(Continued)

FOREIGN PATENT DOCUMENTS

CN          102541335 A      7/2012
CN          102768604 A      11/2012
(Continued)

OTHER PUBLICATIONS

International Preliminary Report on Patentability Appln. No. PCT/CN2013/089279; dated Mar. 15, 2016.
(Continued)

*Primary Examiner* — Christopher R Lamb
(74) *Attorney, Agent, or Firm* — Ladas & Parry LLP

(57) ABSTRACT

Embodiments of the present disclosure relate to the technical field of touch control display, and an array substrate and a touch control display device are provided. The array substrate includes a plurality of touch emitting lines and a plurality of touch sensing lines arranged perpendicular to each other and isolated from each other, each of the touch emitting lines and each of the touch sensing lines form a
(Continued)

touch sensing capacitor. The touch sensing can be realized by sensing a variation in the capacitance value of the touch sensing capacitor when touch occurs. Meanwhile, the projection of each of the touch emitting lines or each of the touch sensing lines on the substrate falls into the projection of gate lines or data lines on the substrate, thus the aperture ratio of the touch control display device is increased.

8 Claims, 4 Drawing Sheets

(56) References Cited

U.S. PATENT DOCUMENTS

| | | | |
|---|---|---|---|
| 2013/0321296 A1* | 12/2013 | Lee | G06F 3/041 345/173 |
| 2014/0022476 A1* | 1/2014 | Park | G02F 1/13306 349/41 |
| 2014/0071066 A1* | 3/2014 | Lee, II | G06F 3/0416 345/173 |
| 2014/0078418 A1* | 3/2014 | Mu | G06F 3/0412 349/12 |
| 2014/0104510 A1 | 4/2014 | Wang et al. | |
| 2014/0111471 A1 | 4/2014 | Zhao | |
| 2014/0184938 A1 | 7/2014 | Chen et al. | |
| 2015/0153875 A1 | 6/2015 | Zhang | |

FOREIGN PATENT DOCUMENTS

| | | |
|---|---|---|
| CN | 102955635 A | 3/2013 |
| CN | 103019492 A | 4/2013 |
| CN | 202887154 A | 4/2013 |
| CN | 202976052 U | 6/2013 |
| CN | 103279215 A | 9/2013 |
| CN | 103294312 A | 9/2013 |

OTHER PUBLICATIONS

Second Chinese Office Action Appl. No. 201310419173.2; dated Apr. 18, 2016.
First Chinese Office Action Appln. No. 201310419173.2; dated Nov. 2, 2015.
International Search Report Appln. No. PCT/CN2013/089279; dated May 8, 2014.
Third Chinese Office Action dated Oct. 9, 2016; Appln. No. 201310419173.2.
The Fourth Chinese Office Action dated Nov. 16, 2017; Appln. No. 201310419173.2.

* cited by examiner

ARRAY SUBSTRATE AND TOUCH CONTROL DISPLAY DEVICE

TECHNICAL FIELD

The present disclosure relates to the technical field of touch control and display, and particularly to an array substrate and a touch control display device.

BACKGROUND

In-cell-touch liquid crystal display technique is a practical touch control technique, and generally, in the in-cell-touch liquid crystal display technique, it is required to arrange touch emitting lines, touch sensing lines and touch control switches in pixel units. It is required that one touch control switch is arranged for a preset number of pixel units, and when a touch control switch is touched, a corresponding touch sensing line outputs a sensing signal, so that the position where the touch occurs can be determined.

However, the arrangement of the touch control switches consumes the aperture ratio of the pixel units additionally, and in turn reduces the aperture ratio of the pixel units.

SUMMARY

In embodiments of the present disclosure, there is provided an array substrate and a touch control display device capable of increasing the aperture ratio of the touch control display device.

The array substrate provided in an embodiment of the present disclosure comprises: a plurality of touch emitting lines and a plurality of touch sensing lines arranged perpendicular to each other and isolated from each other, wherein each of the touch emitting lines and each of the touch sensing lines form a touch sensing capacitor; and the projection of each of the touch emitting lines or that of each of the touch sensing lines on the substrate falls into the projection of gate lines or data lines on the substrate.

Since the projection of each of the touch emitting lines or that of each of the touch sensing lines on the substrate falls into the projection of gate lines or data lines on the substrate, and each of the touch emitting lines and each of the touch sensing lines are arranged perpendicular to each other and isolated from each other, a touch sensing capacitor is formed at a position where the touch emitting line and the touch sensing line cross each other in different planes. When the display device is touched, the capacitance value of the touch sensing capacitor at a corresponding position is changed due to the touch on the display device, so that a corresponding touch sensing line outputs a sensing signal so as to realize the touch sensing, thus avoiding the arrangement of the pixel switches which affects the aperture ratio of the pixels, and in turn increasing the aperture ratio of the touch control display device.

Particularly, in order to facilitate the control, the touch emitting lines are arranged to be extended in a same direction, and the touch sensing lines are arranged to be extended in another direction.

The case in which the projection of each of touch emitting lines or each of touch sensing lines on the substrate falls into the projection of the gate lines or data lines on the substrate can be implemented as: the projection of each of the touch emitting lines on the substrate falls into the projection of the gate lines on the substrate, and the projection of each of touch sensing lines on the substrate falls into the projection of the data lines on the substrate; and as an alternative, the projection of each of touch sensing lines on the substrate falls into the projection of the gate lines on the substrate, and the projection of each of touch emitting lines on the substrate falls into the projection of the data lines on the substrate.

Further, in order to avoid the unnecessary loss due to the excessively dense arrangement of the touch emitting lines and the touch sensing lines while ensuring the touch control sensitivity, every first preset number of pixel units correspond to one touch emitting line, and every second preset number of pixel units correspond to one touch sensing line.

Optionally, the first preset number is equal to the second preset number.

In a practical implementation, the touch emitting lines and the touch sensing lines are arranged in different layers, and there is arranged an isolating layer between the layer where the touch emitting lines are located and the layer where the touch sensing lines are located. Further, in order to decrease the transmission impedance of the touch emitting line or the touch sensing line and in turn decrease the transmission loss, the array substrate further comprises a plurality of metal wire matrices. Each of the metal wire matrices is connected to one touch emitting line or one touch sensing line, wherein the projection of each of metal wire matrices on the substrate falls into the projection of the gate lines and that of the data lines on the substrate.

Further, in order to reduce the technical process flows and the technical process complexity, and decrease the thickness of the substrate at the same time, each of the touch emitting lines comprises a emitting line portion and a bridge line portion, wherein a touch sensing capacitor is formed by the bridge line portion and a corresponding touch sensing line, and the emitting line portion and the touch sensing line are arranged in a same layer; the bridge line portion is a gate line or a data line whose projection covers the projection of the touch emitting line on the substrate, and the emitting line portion and the bridge line portion are connected by via holes.

As an alternative, each of the touch sensing lines comprises a sensing line portion and a bridge line portion, wherein a touch sensing capacitor is formed by the bridge line portion and a corresponding touch emitting line, and the sensing line portion and the touch emitting line are arranged in a same layer; the bridge line portion is a gate line or a data line whose projection covers the projection of the touch sensing line on the substrate, and the sensing line portion and the bridge line portion are connected by via holes.

To further increase the aperture ratio, the projection of via holes on the substrate falls into the projection of a black matrix on the substrate.

Optionally, in order to decrease the transmission impedance of the touch emitting line or the touch sensing line, and in turn reduce the transmission loss, the array substrate further comprises a plurality of metal wire matrices. Each of metal wire matrices is connected to one emitting line portion or one touch sensing line, and the projection of each of metal wire matrices on the substrate falls into the projection of the gate lines and data lines on the substrate. As an alternative, each of metal wire matrices is connected to one sensing line portion or one touch emitting line, and the projection of each of metal wire matrices on the substrate falls into the projection of the gate lines and data lines on the substrate.

The touch control display device provided in an embodiment of the present disclosure comprises the above array substrate.

In the array substrate and the touch control display device provided in the embodiments of the present disclosure, the array substrate comprises a plurality of touch emitting lines and a plurality of touch sensing lines which are arranged perpendicular to each other and are isolated from each other; each of touch emitting lines and each of touch sensing lines form a touch sensing capacitor, and the touch sensing can be realized by sensing a variation in the capacitance value of the touch sensing capacitor when touch occurs; meanwhile, the projection of each of the touch emitting lines or each of the touch sensing lines on the substrate falls into the projection of gate lines or data lines on the substrate, thus the aperture ratio of the touch control display device is increased.

DETAILED DESCRIPTION

In embodiments of the present disclosure, there are provided an array substrate and a touch control display device, wherein the array substrate comprises touch emitting lines and touch sensing lines which are arranged perpendicular to each other and are isolated from each other; each of touch emitting lines and each of touch sensing lines form a touch sensing capacitor, and the touch sensing can be realized by sensing a variation in the capacitance value of the touch sensing capacitor when touch occurs; meanwhile, the projection of each of the touch emitting lines or each of the touch sensing lines on the substrate falls into the projection of gate lines or data lines on the substrate, thus the aperture ratio of the touch control display device is increased.

Figure 1:
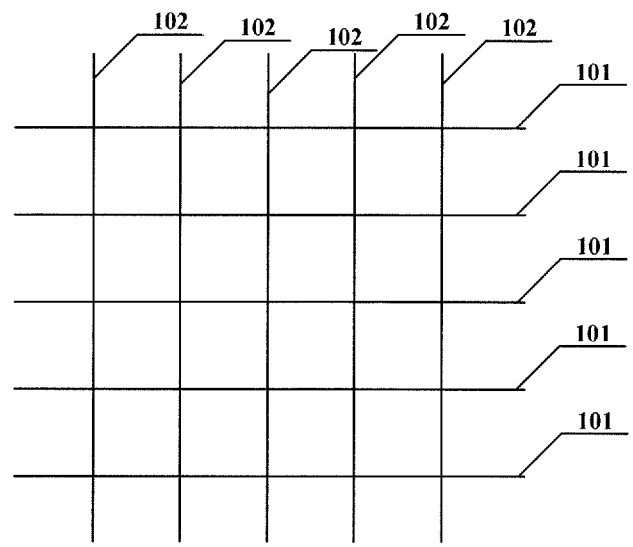
FIG. 1 is a schematic view showing a structure of a touch sensing circuit for an array substrate provided in an embodiment of the present disclosure.

As shown in FIG. 1, the array substrate provided in an embodiment of the present disclosure comprises: touch emitting lines 101 and touch sensing lines 102 arranged perpendicular to each other and isolated from each other. Each of the touch emitting lines 101 and each of the touch sensing lines 102 form a touch sensing capacitor. The projection of each of the touch emitting lines 101 or that of each of the touch sensing lines 102 on the substrate falls into the projection of gate lines or data lines on the substrate.

Since the projection of each of the touch emitting lines 101 or that of each of the touch sensing lines 102 on the substrate falls into the projection of the gate lines or data lines on the substrate, and since each of the touch emitting lines 101 and each of the touch sensing lines 102 are arranged perpendicular to each other and isolated from each other, a touch sensing capacitor is formed at a position where the touch emitting line 101 and the touch sensing line 102 cross each other in different planes. When the display device is touched, the capacitance value of the touch sensing capacitor at a corresponding position is changed due to the touch on the display device, so that a corresponding touch sensing line 102 outputs a sensing signal so as to realize the touch sensing, thus avoiding the arrangement of the pixel switches which affects the aperture ratio of the pixels, and in turn increasing the aperture ratio of the touch control display device.

In order to facilitate the control, in general, the touch emitting lines 101 are arranged to be extended in a same direction, and the touch sensing lines 102 are arranged to be extended in another direction. For example, the projection of the touch emitting lines 101 on the substrate can fall into the projection of the gate lines on the substrate, and the projection of the touch sensing lines 102 on the substrate can fall into the projection of the data lines on the substrate. As an alternative, the projection of the touch sensing lines 102 on the substrate can fall into the projection of the gate lines on the substrate, and the projection of the touch emitting lines 101 on the substrate can fall into the projection of the data lines on the substrate.

That is, the case in which the projection of each of the touch emitting lines 101 or each of the touch sensing lines 102 on the substrate falls into the projection of the gate lines or data lines on the substrate can be implemented as: the projection of each of the touch emitting lines 101 on the substrate falls into the projection of the gate lines on the substrate, and the projection of each of the touch sensing lines 102 on the substrate falls into the projection of the data lines on the substrate; and as an alternative, the projection of each of the touch sensing lines 102 on the substrate falls into the projection of the gate lines on the substrate, and the projection of each of the touch emitting lines 101 on the substrate falls into the projection of the data lines on the substrate.

In general, for most display devices, it is unnecessary that one touch emitting line 101 and one touch sensing line 102 are arranged for each of the pixel units, and only in a certain range, one touch emitting line 101 and one touch sensing line 102 are arranged. That is, every first preset number of pixel units correspond to one touch emitting line, and every second preset number of pixel units correspond to one touch sensing line, the first preset number and the second preset number can be set as 15~25. In such a case, it can avoid the unnecessary loss due to the excessively dense arrangement of the touch emitting lines 101 and the touch sensing lines 102 while ensuring the touch control sensitivity. Normally, the first preset number can be equal to the second preset number, and for example, the first preset number and the second preset number are both 20.

An implementation provided in an embodiment of the present disclosure is in that the touch emitting lines 101 and the touch sensing lines 102 are arranged in different layers, and in that there is arranged an isolating layer between the layer where the touch emitting lines 101 are located and the layer where the touch sensing lines 102 are located.

Further, the array substrate in an embodiment of the present disclosure can comprise a plurality of metal wire matrices connected to each of the touch emitting lines 101 and each of the touch sensing lines 102, respectively. The projection of the metal wire matrices on the substrate falls into the projection of the gate lines and that of the data lines on the substrate. One metal wire matrix is connected to one touch emitting line 101 or one touch sensing line 102, for assisting the transmission on the touch emitting line 101 or the touch sensing line 102, and reducing the transmission impedance of the touch emitting line 101 or the touch sensing line 102, so as to decrease the transmission loss, thus increasing touch control area and improving sensitivity simultaneously.

The metal wires in the metal wire matrix can correspond to gate lines and data lines one to one, so as to achieve an optimal transmission effect; or the number of the metal wires can less than that of the gate lines and the data lines, so as to decrease the technical process difficulty.

Figure 2A:
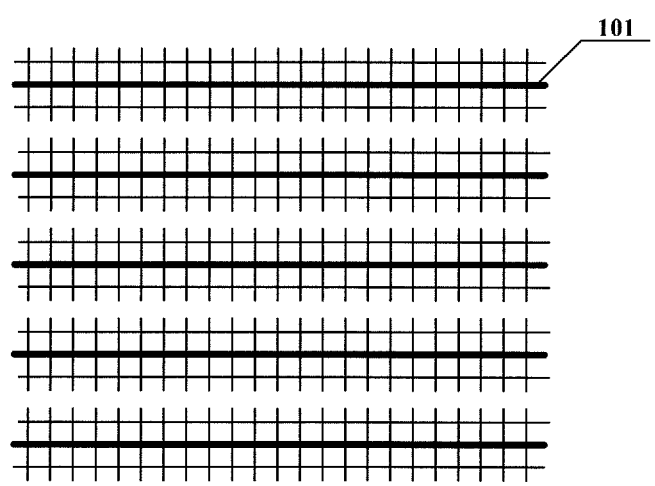
FIGS. 2a and 2b are schematic views showing a specific structure of a touch sensing circuit for an array substrate provided in an embodiment of the present disclosure.
Figure 2B:
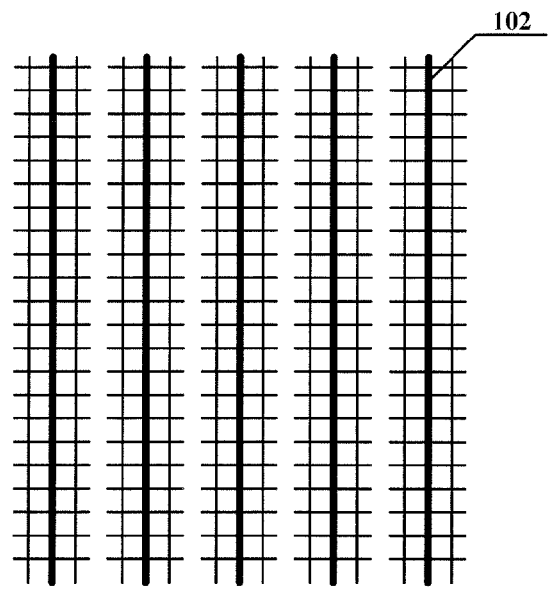

As shown in FIGS. 2a and 2b, the thick lines represent the touch emitting lines 101 and the touch sensing lines 102, and other lines represent metal wires. Since the touch emitting lines 101 and the touch sensing lines 102 are arranged in different layers, the touch emitting lines 101 and the touch sensing lines 102 are isolated from each other, the same situation is also applied to the metal wires connected to the touch emitting lines 101 and the touch sensing lines 102, the metal wires connected to the touch emitting lines 101 and the metal wires connected to the touch sensing lines 102, the touch emitting lines 101 and the metal wires connected to the touch sensing lines 102.

In order to reduce the technical process flows and the technical process complexity, and decrease the thickness of the substrate at the same time, in another implementation according to an embodiment of the present disclosure, the touch emitting lines 101 and the touch sensing lines 102 are arranged in a same layer.

Figure 3:
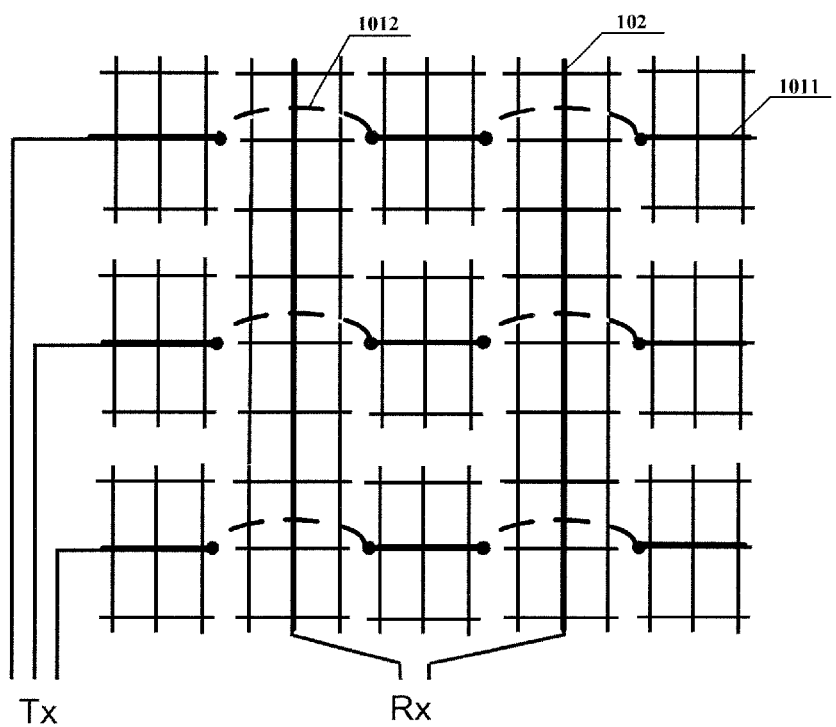
FIG. 3 is a schematic view showing a structure of a touch sensing circuit for a preferable array substrate provided in an embodiment of the present disclosure.

For example, as shown in FIG. 3, the touch emitting line 101 comprises a emitting line portion 1011 and a bridge line portion 1012, a touch sensing capacitor is formed by the bridge line portion 1012 and the touch sensing line 102, and the emitting line portion 1011 and the touch sensing line 102 are arranged in a same layer. The bridge line portion 1012 is a gate line or a data line whose projection covers the projection of the touch emitting line on the substrate, and the emitting line portion and the bridge line portion are connected by via holes.

Figure 4:
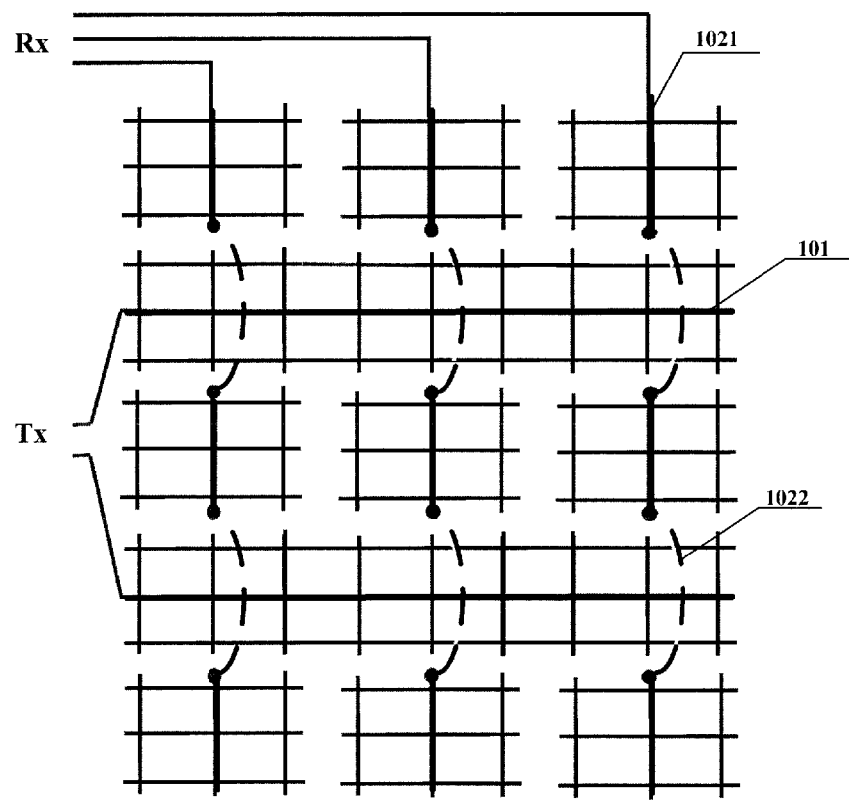
FIG. 4 is another schematic view showing a structure of a touch sensing circuit for a preferable array substrate provided in an embodiment of the present disclosure.

As an alternative, as shown in FIG. 4, the touch sensing line 102 comprises a sensing line portion 1021 and a bridge line portion 1022, a touch sensing capacitor is formed by the bridge line portion 1022 and the touch emitting line 101, and the sensing line portion 1021 and the touch emitting line 101 are arranged in a same layer. The bridge line portion 1022 is a gate line or a data line whose projection covers the projection of the touch sensing line 102 on the substrate, and the sensing line portion 1021 and the bridge line portion 1022 are connected by via holes.

Figure 5:
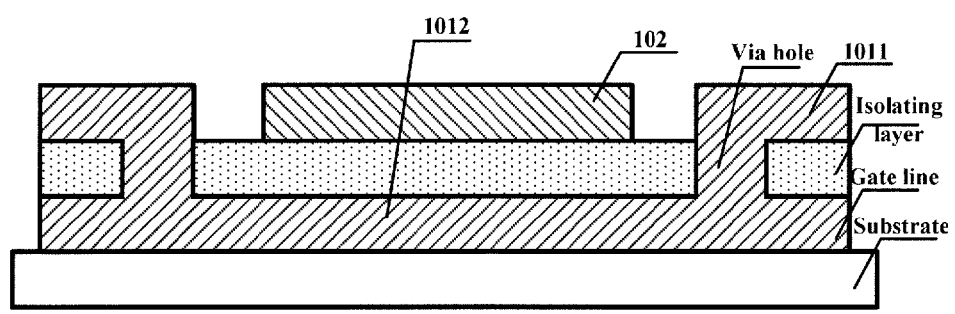
FIG. 5 is a cross-sectional view of an array substrate provided in an embodiment of the present disclosure.

Taking a case in which the touch emitting line 101 comprises the emitting line portion 1011 and the bridge line portion 1012 as an example, FIG. 5 illustrates a cross-sectional view of an array substrate along any one dashed line shown in FIG. 3. In FIG. 5, the cross-sectional view includes one dashed line (the bridge line portion) and the emitting line portion at the both ends of the dashed line.

To further increase the aperture ratio, the projection of the via holes on the substrate falls into the projection of a black matrix on the substrate. In order to decrease the technical process difficulty, one of the touch emitting lines 101 and the touch sensing lines 102 which are extended along the direction in which the black matrix has a longer width as compared to another direction perpendicular thereto can be divided into the emitting line portion 1011 and the bridge line portion 1012, or can be divided into the sensing line portion 1021 and the bridge line portion 1022.

Further, in order to decrease the transmission impedance, the array substrate according to an embodiment of the present disclosure further comprises a plurality of metal wire matrices.

Each of metal wire matrices is connected to one emitting line portion 1011 or one touch sensing line 102, and the projection of each of metal wire matrices on the substrate falls into the projection of the gate lines and data lines on the substrate.

As an alternative, each of metal wire matrices is connected to one sensing line portion 1021 or one touch emitting line 101, and the projection of each of metal wire matrices on the substrate falls into the projection of the gate lines and data lines on the substrate.

It can be seen from FIG. 3 that the metal wire matrices connected to the touch sensing line 102 are extended continuously in a longitudinal direction, and the metal wire matrices connected to the respective emitting line portions 1011 are separated by the touch sensing lines 102 and the metal wire matrices connected to the touch sensing lines 102.

It can be seen from FIG. 4 that the metal wire matrices connected to the touch emitting lines 101 are extended continuously in a horizontal direction, and the metal wire matrices connected to the respective sensing line portions 1021 are separated by the touch emitting lines 101 and the metal wire matrices connected to the touch emitting lines 101.

Figure 6:
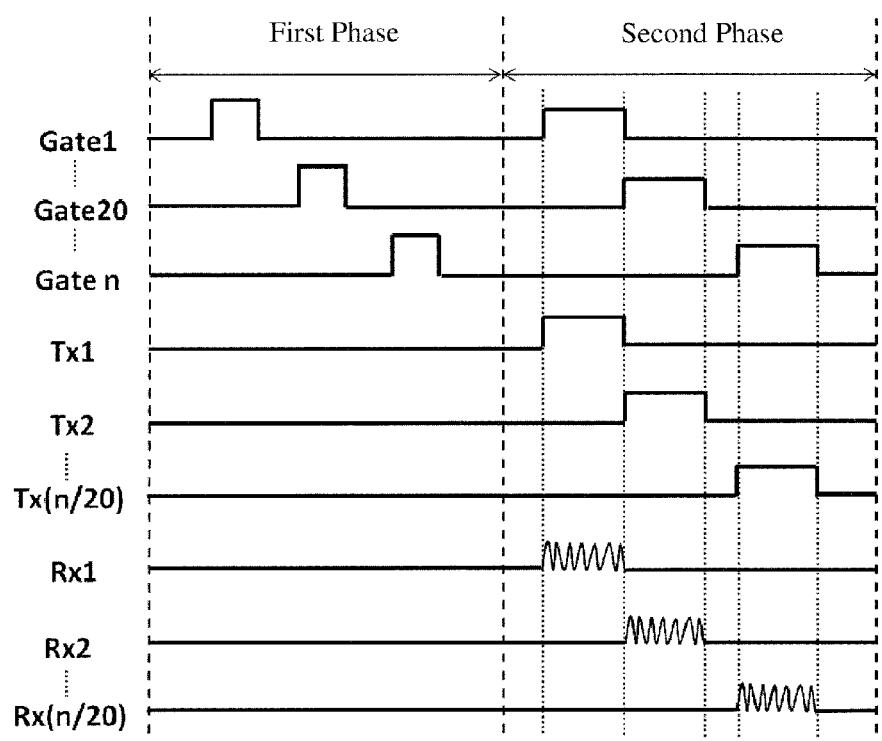
FIG. 6 is a timing chart of a touch sensing circuit provided in an embodiment of the present disclosure.

Since in such an implementation, the touch emitting lines 101 or the touch sensing lines 102 include a portion of gate lines or data lines, and in order to avoid the interference between the display and the touch control, the display driving and the touch control driving of the array substrate are performed in a time-division mode. For the circuit structure shown in FIG. 3, every twenty pixel units correspond to one touch emitting line 101, and every twenty pixel units correspond to one touch sensing line 102, and the timing of the circuit structure is shown in FIG. 6. During a first phase, the display driving is performed, and only gate lines (Gate) transmit signals. During a second phase, the touch control driving is performed, since the gate lines are connected to the touch emitting lines 101 (Tx), same timing signals are emitted from the gate lines, and the touch sensing lines 102 (Rx) output signals. When the capacitance value of a touch sensing capacitor is changed due to the touch on the touch sensing capacitor, the signal outputted from the touch sensing line 102 is changed accordingly, so that the position of the touch sensing capacitor which is touched can be located, thus achieving the touch control.

Further, the touch control display device provided in an embodiment of the present disclosure comprises the array substrate provided in the above embodiments of the present disclosure.

In the embodiments of the present disclosure, the array substrate and the touch control display device are provided. The array substrate comprises a plurality of touch emitting lines and a plurality of touch sensing lines which are arranged perpendicular to each other and are isolated from each other; each of the touch emitting lines and each of the touch sensing lines form a touch sensing capacitor. The touch sensing can be realized by sensing a variation in the capacitance value of the touch sensing capacitor when touch occurs. Meanwhile, the projection of each of the touch emitting lines or each of the touch sensing lines on the substrate falls into the projection of gate lines or data lines on the substrate, thus the aperture ratio of the touch control display device is increased.

Obviously, those skilled in the art can make various modifications and variations to the embodiments of the present disclosure without departing from the spirit and the scope of the present disclosure, and all such modifications and variations are intended to be included within the scope of the present disclosure provided that such modifications and variations belong to the scope of the claims and the equivalence thereof.

What is claimed is:

1. An array substrate comprising:
   a plurality of touch emitting lines and a plurality of touch sensing lines arranged perpendicular to each other and isolated from each other, and
   a plurality of data lines and a plurality of gate lines, wherein
   each of the touch emitting lines and each of the touch sensing lines are configured to form a touch sensing capacitor;
   the projection of each of the touch emitting lines on the substrate is configured to fall into the projection of the gate lines on the substrate, every first present number of gate lines are configured to correspond to only one touch emitting line, and the projection of each of the touch sensing lines on the substrate is configured to fall into the projection of the data lines on the substrate, every second present number of data lines are configured to correspond to only one touch sensing line; or,
   the projection of each of the touch sensing lines on the substrate is configured to fall into the projection of the gate lines on the substrate, every second present number of gate lines are configured to correspond to only one touch sensing line, and the projection of each of the touch emitting lines on the substrate is configured to fall into the projection of the data lines on the substrate, every first present number of data lines are configured to corresponds to only one touch emitting line,
   wherein each of the touch emitting lines comprises a emitting line portion and a bridge line portion, the touch sensing capacitor is formed by the bridge line portion and the corresponding touch sensing line, and the emitting line portion and the touch sensing line are arranged in a same layer; the bridge line portion is the gate line or the data line whose projection covers the projection of the touch emitting line on the substrate, and the emitting line portion and the bridge line portion are connected by via holes: or
   each of the touch sensing lines comprises a sensing line portion and a bridge line portion, the touch sensing capacitor is formed by the bridge line portion and the corresponding touch emitting line, and the sensing line portion and the touch emitting line are arranged in a same layer; the bridge line portion is the gate line or the data line whose projection covers the projection of the touch sensing line on the substrate, and the sensing line portion and the bridge line portion are connected by via holes.

2. The array substrate of claim 1, wherein the first preset number is equal to the second preset number.

3. The array substrate of claim 1, wherein the projection of the via holes on the substrate is configured to fall into the projection of a black matrix on the substrate.

4. The array substrate of claim 1, further comprising a plurality of metal wire matrices, wherein
   each of the metal wire matrices is connected to one emitting line portion or one touch sensing line, and the projection of each of the metal wire matrices on the substrate is configured to fall into the projection of the gate lines and data lines on the substrate; or
   each of the metal wire matrices is connected to one sensing line portion or one touch emitting line, and the projection of each of the metal wire matrices on the substrate is configured to fall into the projection of the gate lines and data lines on the substrate.

5. A touch control display device comprising the array substrate of claim 1.

6. The touch control display device of claim 5, wherein the first preset number is equal to the second preset number.

7. The touch control display device of claim 5, wherein the projection of the via holes on the substrate is configured to fall into the projection of a black matrix on the substrate.

8. The touch control display device of claim 5, wherein the array substrate further comprises a plurality of metal wire matrices, wherein
   each of the metal wire matrices is connected to one emitting line portion or one touch sensing line, and the projection of each of the metal wire matrices on the substrate is configured to fall into the projection of the gate lines and data lines on the substrate; or
   each of the metal wire matrices is connected to one sensing line portion or one touch emitting line, and the projection of each of the metal wire matrices on the substrate is configured to fall into the projection of the gate lines and data lines on the substrate.

* * * * *